United States Patent [19]

DeFoort et al.

[11] Patent Number: 5,684,847
[45] Date of Patent: Nov. 4, 1997

[54] SILVER-BASED ALLOY CONTAINING INDIUM AND CADMIUM FOR THE PRODUCTION OF NEUTRON-ABSORBER COMPONENTS, AND USE

[75] Inventors: Françoise DeFoort, Claix; Luc Pillet, Lyon, both of France

[73] Assignee: Framatome, Velizy-Villacoublay, France

[21] Appl. No.: 666,570

[22] PCT Filed: Oct. 13, 1995

[86] PCT No.: PCT/FR95/01356

§ 371 Date: Sep. 18, 1996

§ 102(e) Date: Sep. 18, 1996

[87] PCT Pub. No.: WO96/14639

PCT Pub. Date: May 17, 1996

[30] Foreign Application Priority Data

Nov. 2, 1994 [FR] France ................... 94 13 085

[51] Int. Cl.$^6$ .................................................. G21C 7/00
[52] U.S. Cl. ........................ 376/339; 376/419; 376/327
[58] Field of Search ........................ 376/339, 419, 376/327; 420/506; 976/DIG. 120

[56] References Cited

U.S. PATENT DOCUMENTS

| | | | |
|---|---|---|---|
| 2,935,401 | 5/1960 | Anderson | 75/173 |
| 3,074,871 | 1/1963 | Lustman et al. | 204/193.2 |
| 3,923,502 | 12/1975 | Portnoi et al. | 75/170 |
| 4,172,762 | 10/1979 | Anthony et al. | 376/327 |
| 4,695,476 | 9/1987 | Feild, Jr. | 427/6 |
| 4,699,756 | 10/1987 | Nguyen | 376/333 |
| 4,752,440 | 6/1988 | Ahlinder et al. | 376/333 |
| 4,762,675 | 8/1988 | Feilds, Jr. | 376/414 |
| 4,874,574 | 10/1989 | Igarashi et al. | 376/333 |
| 5,064,607 | 11/1991 | Miller et al. | 376/333 |

OTHER PUBLICATIONS

Patent Abstracts of Japan, vol. 16, No. 68, "Power Control Rod For Pressurized Water Reactor", Feb. 19, 1992.

*Primary Examiner*—Charles T. Jordan
*Assistant Examiner*—Meena Chelliah
*Attorney, Agent, or Firm*—Pollock, Vande Sande & Priddy

[57] ABSTRACT

The alloy contains, expressed in atomic percentages, 9 to 12% of indium and 4 to 5.35% of cadmium, the remainder consisting of silver with the exception of unavoidable impurities in very low quantities. The alloy preferably contains 9 to 10% of indium and 4.35% to 5.35% of cadmium. The alloy can be used in the form of pellets or bars placed inside a tubular casing, in order to form a neutron-absorber component of a rod cluster for controlling the reactivity of a pressurized water nuclear reactor.

5 Claims, 1 Drawing Sheet

– A –

SILVER-BASED ALLOY CONTAINING INDIUM AND CADMIUM FOR THE PRODUCTION OF NEUTRON-ABSORBER COMPONENTS, AND USE

FIELD OF THE INVENTION

The invention relates to a silver-based alloy containing indium and cadmium for the production of neutron-absorber components in the core of a nuclear reactor.

BACKGROUND OF THE INVENTION

Nuclear reactors, and in particular, nuclear reactors cooled by pressurized water, contain a core consisting of prismatically shaped fuel assemblies arranged vertically and juxtaposed. Each of the fuel assemblies consists of a bundle of mutually parallel fuel rods which are held by a framework consisting of spacer grids and guide tubes connected rigidly to the spacer grids which are distributed along the length of the fuel assembly.

During operation of the nuclear reactor, it is necessary to provide means for controlling the power delivered by the core in which fission reactions that liberate energy in the form of heat take place. It is also necessary to provide means for shutting down the nuclear reactor at the end of an operating cycle or in the event of an incident requiring an emergency shutdown.

Control of the power of the core and shutdown of the reactor are carried out using neutron-absorber components and, in particular, absorber components which can be inserted to a greater or lesser extent into the core, depending on the control or shutdown phases of the nuclear reactor.

Use is made, in particular, of absorber components in the form of rod clusters which can be introduced and displaced inside guide tubes of some of the fuel assemblies.

The rods in a given cluster are connected at one of their ends to a support which includes radiating arms and a hub for connecting the cluster to a follower, this cluster support being generally referred to by the term "spider".

The absorber rods in clusters for controlling and shutting down a nuclear reactor have a tubular casing in which pellets of absorber material are stacked.

The absorber materials most commonly used include boron carbide $B_4C$ and ternary alloys of silver, indium and cadmium (SIC).

Depending on the use of the absorber rod clusters, for controlling or shutting down the nuclear reactor, the composition of the absorber rods may vary, so that these rods may contain only pellets of $B_4C$ or SIC, pellets of both $B_4C$ and SIC, or else pellets of highly absorbent materials ($B_4C$ or SIC, for example) and materials which are weaker absorbers of neutrons.

One of the objects in the design of the rods in the absorber rod clusters of a nuclear reactor is to extend the lifetime of the rod clusters as much as possible, so as to reduce the operating costs of a nuclear reactor to a maximum extent.

The lifetime of the rod clusters for controlling and shutting down a nuclear reactor is generally expressed in numbers of cycles, each of the cycles corresponding to a period of operation of a nuclear reactor between two core assembly refuelling operations.

The lifetime of the absorber rod clusters of a nuclear reactor is limited because of the appearance and development, during operation of the nuclear reactor, of cracks which penetrate the casing of the rods containing the pellets of absorber material, and because of the swelling of the absorber material.

Because of the development of these cracks, it is necessary to remove and discard the rod clusters after they have been used for some time in the nuclear reactor.

The pellets of absorber material have a nominal diameter, when they are loaded into the casings, which is less than the nominal internal diameter of the casing. Some degree of clearance therefore remains between the lateral surface of the pellets and the inner surface of the casing of an absorber rod at the end of manufacture. The absorber pellets are held inside the casing by plugs for closing the ends of the casing and by a coil spring interposed between one of the closure plugs of the casing and the corresponding end of the column of absorber pellets.

The internal volume of the casing, which is closed in a completely leaktight manner by the plugs, may be filled with a pressurized gas.

In an operating reactor, the pellets of absorber material undergo swelling which results in radial expansion of the pellet as well as settling due to creep, so that the clearance between the outer lateral surface of the pellet and the inner surface of the casing tends to decrease when the absorber rod is exposed to the conditions prevailing in the nuclear reactor and, in particular, to the neutron flux inside the core.

After the absorber rods have been used for some time, the clearance between the pellets and the casings becomes zero and the pellets then start to exert a thrust on the casing, in particular in radial directions, which causes deformation of this casing by radial expansion.

When an silver-indium-cadmium (SIC) alloy is used as the absorber material, for example in the form of pellets, the diametral expansion of the pellets is due in part to the swelling of the material, under the effect of irradiation, i.e., because of the action of the neutrons on the material inside the core of the nuclear reactor.

The irradiation-induced swelling of SIC is itself caused by the transmutations of the elements in the alloy by the neutrons and the displacements of atoms in the lattice of the alloy, under the effect of neutron bombardment, which results in by the creation of defects such as vacancies, dislocation loops or cavities.

The transmutations of the elements in the alloy relate to silver, which is transformed into cadmium, and indium, which is transformed into tin, under the effect of epithermal neutrons whose energy lies between 0.625 and 8 eV.

Because of the difference in volume of the atoms of the elements present, volume expansion of the face-centered cubic (fcc) lattice of the silver-indium-cadmium alloy takes place.

Furthermore, the increase in the overall concentration of cadmium, indium and tin elements in the alloy, due to the transmutations, is expressed by the appearance of a second phase having a hexagonal close-packed (hcp) structure, when the limit of solubility of the alloy elements in the face-centered cubic silver is reached and then exceeded. This hexagonal close-packed phase occupies more volume than the initial face-centered-cubic phase.

The SIC alloys conventionally used for forming the neutron-absorber components in the core of a nuclear reactor contain, expressed as atomic percentages, 14 to 14.5% of indium, 4.6 to 5.15% of cadmium, the remainder of the alloy consisting of silver with the exception of unavoidable impurities in very low quantities.

Such alloys according to the prior art undergo swelling when they are used to form the absorber material of control rod clusters, with high negative reactivity, of a nuclear reactor cooled and moderated by pressurized water, which are frequently inserted into the core of the nuclear reactor.

To date, the solutions adopted for extending the lifetime of the control rod clusters frequently inserted into the core of the reactor have not taken into account the effect on the swelling of the absorber material of the transformation of the face-centered phase into the hexagonal close-packed phase. It has consequently never been proposed to adjust the composition of the SIC alloys, making it possible to delay the appearance of the hexagonal close-packed phase in the absorber material during its use in the core of the nuclear reactor.

SUMMARY OF THE INVENTION

The object of the invention is to provide a silver-based alloy containing indium and cadmium for the production of neutron absorber components in the core of a nuclear reactor which has an increased resistance to swelling in the core of the reactor and makes it possible to produce absorber components whose lifetime is substantially lengthened.

To this end, the alloy according to the invention contains, expressed as atomic percentages, 9 to 12% of indium and 4 to 5.35% of cadmium, the remainder consisting of silver with the exception of unavoidable impurities in very small quantities.

BRIEF DESCRIPTION OF THE DRAWING

By way of illustration of the invention, a description will now be given, with reference to the appended drawing, of the behavior under irradiation of rods in absorber rod clusters whose absorber material consists at least partially of an alloy according to the invention, in comparison with absorber rod clusters according to the prior art.

The single FIGURE is a diagram representing the variations in the diametral clearance between the pellets and the casing of a rod of an absorber rod cluster as a function of the number of working cycles of the cluster in the core of a pressurized water nuclear reactor.

DESCRIPTION OF THE PREFERRED EMBODIMENT

Figure 1:
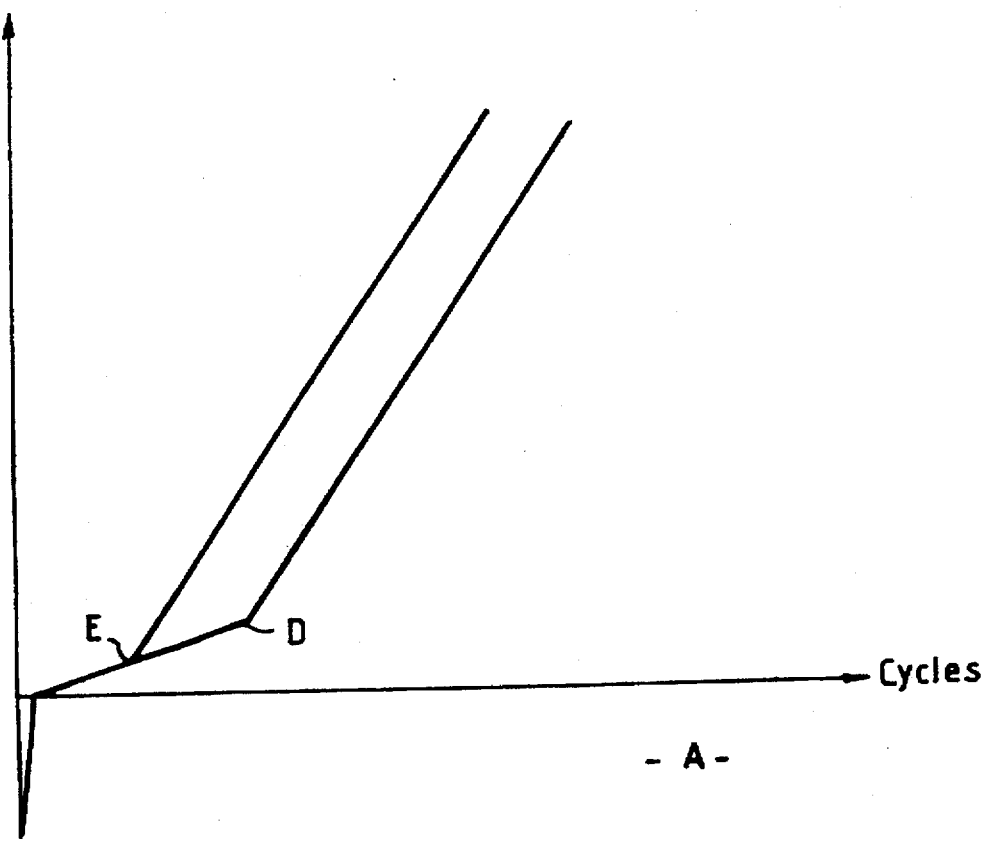

The FIGURE relates to a control rod cluster containing rods whose absorber material has a composition according to the invention and, by way of comparison, to a rod cluster whose absorbent material is produced according to the prior art.

An alloy according to the invention is made by metallurgical methods which are conventional in the context of SIC alloys.

For implementation of the illustrative embodiments which will be described, an alloy according to the invention was made, containing, expressed as atomic percentages, 9.5% of indium and 4.85% of cadmium, the remainder of the alloy consisting of silver with the exception of unavoidable impurities in an extremely small quantity.

The composition of the alloy was chosen in such a way as to delay very substantially the appearance of the hexagonal close-packed phase during the use in a pressurized water nuclear reactor of control rod clusters containing the material according to the invention.

The composition of the alloy was also chosen in such a way as to keep the neutron-absorption characteristics of the rod cluster at values close to those obtained with rod clusters containing an Sic material according to the prior art.

The alloy composition preferentially defined is centered on 9.5% of indium and 4.85% of cadmium (atomic percentages). However, this composition can vary slightly around the central values with an amplitude of 0.5 atomic %. The indium content can therefore lie between 9 and 10% and the cadmium content between 4.35 and 5.35%.

A material according to the prior art was also used, containing, expressed as atomic percentages, 14.25% of indium and 4.85% of cadmium, which is made in the same way as the alloy according to the invention and formed into cylindrical pellets or bars.

In the case of the alloy according to the invention, the decrease in the percentage of indium is compensated for by the increase in the silver content, which is close to 85 atomic % in the case of the alloy according to the invention, whereas this content is only of the order of 81% in the case of the alloy according to the prior art.

More generally, the composition of the alloys according to the invention is defined in the manner described below as regards the elements indium, cadmium and silver.

Indium

The indium should be in a proportion of less than 12 atomic % in the alloy according to the invention, so as to delay the appearance of the hexagonal close-packed phase in the absorbent material under irradiation.

The appearance of the hexagonal close-packed phase is delayed more as the indium content decreases.

In fact, a study carried out by the applicants on alloys according to the prior art, containing between 14 and 14.50 atomic % of indium, has shown that the appearance of a hexagonal close-packed phase in the SIC face-centred cubic matrix is delayed when the indium proportion changes from the maximum of 14.50 atomic % to the minimum of 14 atomic %. The delay in the appearance of the hexagonal close-packed phase, and therefore the slowing of the swelling under irradiation and the cracking of the absorber rods is very significant and makes it possible to explain the differences in operational life of the absorber rods which are observed during the operation of pressurized water nuclear reactors. However, when the indium content remains greater than 14 atomic %, the gain obtained is too small compared to the duration of a cycle for the manufacture of the SIC alloys according to the prior art to be oriented towards the bottom of the indium content range of the conventional composition.

The studies carried out by the applicants have shown that an appreciable gain is only obtained for an indium content of less than or equal to 12 atomic %.

As will be shown further on in the illustrative embodiments, one of the fundamental aspects of the invention consists in reducing the indium content to below the lower limit adopted for the alloys according to the prior art and, more precisely, in fixing the indium content preferentially at a value of close to 9.5 atomic %.

Furthermore, it is not desirable to reduce the proportion of indium to below 9 atomic %, in order to avoid degradation of the neutron absorption characteristics of the material.

Cadmium

The cadmium should be limited to a content of less than 5.35 atomic %, so as to preserve the advantage obtained by the decrease in the indium content as regards the delay in the appearance of the hexagonal close-packed phase.

Furthermore, the cadmium content should not fall below 4%, in order to avoid degradation of the neutron-absorption characteristics of the SiC material.

Silver

Silver constitutes the basis of the alloy, and its content is increased so as exactly to compensate for the decrease in the indium content.

The silver content is therefore generally between 81 and 87 atomic %.

Control rod clusters of a nuclear reactor were produced by using an alloy according to the invention, with 9.5% of indium and 4.85% of cadmium, and an alloy according to the prior art, with 14.25% of indium and 4.85% of cadmium.

In all cases, the absorber material is used in the form of cylindrical pellets having either a diameter of 7.65, which is the nominal diameter of the pellets of absorber material in rod clusters according to the prior art (case of Examples 1 and 2 below), or a diameter of slightly less than 7.52 mm, making it possible to increase the clearance between the pellets and the casing of the absorber rods.

The pellets of SIC material are stacked inside a stainless steel casing in order to form the lower part of a control rod cluster, this lower part having a length of 0.75 to 1 m.

The test rod clusters which were used, during normal operation of the nuclear reactor, as control rod clusters frequently inserted into the core, at least in their lower part which consists of the SIC alloy.

The tests consist in measuring the diametral expansion of the absorber rods of the rod cluster, at the end of successive operating cycles of a nuclear reactor.

In the case of the tests carried out, an operating cycle of the nuclear reactor has a duration of 300 EFPD (equivalent full power days), i.e., a duration corresponding to 300 days of operation of the core of the nuclear reactor at full power.

The applicants have techniques making it possible to limit the SIC creep/settling phenomenon, so that the tests were carried out in the case of rapid creep/settling, in the case of slow creep/settling and in the case of creep/settling at a medium rate.

EXAMPLE 1

The control rod clusters were formed from pellets of the SIC material according to the invention, with 9.5% of indium, not having been subjected to a treatment for limiting the creep/settling phenomenon.

At the end of each of the operating cycles of the nuclear reactor, with a duration of 300 EFPD, the diametral swelling of the casing of the absorber rods in the rod clusters is measured.

The change in the diametral clearance between the pellets and the casing is deduced therefrom. The diametral clearance is considered to be negative until the moment when the pellets come into contact with the casing, the clearance then being zero, and positive when the casing undergoes swelling under the effect of the swelling of the pellets which it contains.

The test results were recorded in the form of a diagram giving the pellet/casing diametral clearance during successive irradiation cycles.

Successive phases in which the kinetics of the diametral expansion of the pellets are different are observed.

In a first phase, corresponding to take-up of the clearance between the pellets and the casing (region A), the diametral expansion of the pellets is very rapid.

In the phase corresponding to region A, the diametral expansion of the pellets is due both to the creep/settling and to the radiation-induced swelling of the absorber material.

In a second phase, the casing swells under the effect of the radiation-induced swelling of the pellets.

The kinetics of the swelling changes abruptly at point D. The Applicant Companies have been able to show that this difference in kinetics is due to the appearance of the hexagonal close-packed phase.

In the case of the alloy according to the invention, with 9.5% of indium, the appearance of the hexagonal phase is delayed compared to a conventional with 14.25% of indium.

It has been possible to show that the transformation of the face-centered cubic phase into the hexagonal close-packed phase is the dominant factor which defines the kinetics of the cracking of the casing under irradiation.

In the case of an alloy according to the prior art, the hexagonal phase appears after a smaller number of cycles (point E). The swelling kinetics becomes faster after a shorter total residence time inside the nuclear reactor.

Cracking of the casing may appear when the casing has undergone a certain amplitude of swelling.

The swelling kinetics of the cracked casing is determined by the kinetics of the creep/settling and that of the irradiation-induced swelling of the material according to the invention, the rates of which are added together. The swelling rate is less than the radial expansion rate during the first phase, in particular because of the appearance of the hexagonal close-packed phase, which reduces the creep/settling rate.

The lifetime of the control rod clusters containing an absorber alloy according to the invention is lengthened considerably relative to the lifetime of the rod clusters according to the prior art.

EXAMPLE 2

Control rod clusters of a pressurized water nuclear reactor were made from absorbent material according to the invention, with 9.5% of indium, and from material according to the prior art, with 14.25% of indium.

The pellets of SIC material according to the invention and the pellets of SIC material having a composition according to the prior art were furthermore subjected to a treatment making it possible to limit the rate of creep/settling inside the core of a nuclear reactor to a medium value.

As in Example 1, measurements of diametral expansion of the absorber rods were taken after each of operating cycles of the nuclear reactor.

The diametral clearance between the pellets and the casing were determined from the diametral expansion values.

The phases already described with reference to Example 1 are again found in the case of Example 2, but with different diametral expansion kinetics insofar as the creep/settling rate is substantially less than in the case of Example 1.

Because of the later appearance of the hexagonal phase in the case of the alloy according to the invention, the kinetics of irradiation-induced swelling of the material according to the invention and of the material according to the prior art become different as soon as the transformation starts to take place in the material according to the prior art. This transformation of the material according to the prior art can take place during the clearance take-up phase. The pellets then come into contact with the casing with some degree of delay in the case of the material according to the invention.

In the case of the alloy according to the invention, treated in order to limit the creep rate, a gain is obtained in terms of the time before the casing cracks in comparison with an alloy according to the prior art which is not treated in order to limit the creep rate.

The operational life of the rod cluster is substantially lengthened in comparison with the case of the material according to the prior art and in comparison with the case of material according to the invention in Example 1.

There is therefore an additive effect of the choice of a composition according to the invention and of the treatment for limiting the creep/settling rate.

EXAMPLE 3

By using an absorber alloy according to the invention and by using an absorber alloy according to the prior art, control rod clusters for a nuclear reactor were produced so as to carry out, as in the case of Examples 1 and 2, a comparative study of the swelling and cracking of the rods in a rod cluster in the core of the nuclear reactor.

The production of the rod clusters corresponds to a novel design in which the diametral clearance between the absorber material and the casing is increased, the pressure exerted by the pellet retention spring is decreased and the use of helium for filling makes it possible to limit the temperature of the casing and of the pellets.

Because of the increase in the initial clearance between the pellets and the casing, the clearance take-up (region A) takes substantially longer in comparison with the case of the rods in Examples 1 and 2.

Although in the case of the rods in the control rod clusters in Example 3, the treatment of the absorber material leads to a medium creep rate, the duration of the clearance take-up phase is increased in comparison with the case of the rods of the control rod clusters according to Example 2.

The diametral expansion of the pellets, in the case of the alloy according to the prior art and in the case of the alloy according to the invention, furthermore has different rates as soon as the hexagonal phase appears in the pellets having the composition according to the prior art, which may take place during the clearance take-up phase.

The take-up of the clearance between the pellets and the casing can therefore take place over a longer period of time, as regards the pellets made of material according to the invention.

After the delayed appearance of the hexagonal phase in the alloy according to the invention, the swelling kinetics of the rods containing elements of the material according to the invention is substantially identical to the inflation kinetics in the case of an absorber material according to the prior art.

The onset of cracking of the rod clusters is reached with a time delay as regards the alloy according to the invention in comparison with the alloy according to the prior art.

The operational life of the rods in the control rod clusters whose absorber material has a composition according to the invention is substantially lengthened.

The characteristics of the rods which limit creep/settling combine with the composition of the alloy according to the invention to provide a very substantially extended operational life.

In all cases, the use of a composition according to the invention therefore makes it possible to delay the appearance of the hexagonal close-packed phase, to delay cracking and to lengthen the lifetime of the control rod cluster. Other methods making it possible to limit the swelling and/or cracking of the casing can be combined with this use of a composition according to the invention.

In particular, the absorber components made of an alloy according to the invention can be arranged, in order to form absorber rods of a control rod cluster of a nuclear reactor, inside a tube with increased radial clearance in comparison with the clearance usually maintained around the pellets of absorber material of the rods in control rod clusters of a pressurized water nuclear reactor. In order to obtain a substantial effect on the delay in cracking of the casings of the absorber rods and on the operational life of the control rod clusters, it is necessary to provide an initial clearance at least equal to 150 μm. It is also desirable to increase the effect of an increased clearance on the delay in cracking and on the operational life of the rod clusters by reducing the bearing force of the spring on the pellets and by filling the internal volume of the casing with helium under sufficient pressure.

It is possible to design control rod clusters containing a material in the form of pellets or in another form, for example in the form of bars, made of a silver-indium-cadmium alloy according to the invention and having geometrical and structural characteristics other than those which have been indicated above.

It is also, possible to use the alloy according to the invention as the absorber component of rod clusters other than those of a pressurized water nuclear reactor.

In general, the alloy according to the invention can be used for producing any rod cluster for controlling or shutting down a nuclear reactor and, more generally, for producing neutron-absorber components of any type.

What is claimed is:

1. An absorber rod of a control cluster of a pressurized water nuclear reactor comprising a tubular casing closed by leaktight plugs and cylindrical pellets of absorber material stacked inside said tubular casing and spring-biased on one another by a spring interposed between a closure plug of said casing and one end of a stack of pellets inside said casing, wherein said absorber material of at least a part of said pellets is a silver-based alloy containing, expressed in atomic percentages, 9 to 12% indium and 4 to 5.35% cadmium, a remainder of said alloy consisting of silver with an exception of very small quantities of unavoidable impurities, and wherein said pellets of absorber material have a nominal diameter less than a nominal internal diameter of said casing, so that a diametral clearance of more than 150 μm remains between a lateral surface of said pellets and an inner surface of said casing, before said absorber rod is introduced into a core of a nuclear reactor in operation.

2. The absorber rod according to claim 1, wherein said absorber material contains, expressed in atomic percentages, 9 to 10% indium and 4.35 to 5.35% cadmium.

3. The absorber rod according to claim 1, wherein the at least part of said pellets made of said absorber material is arranged in an end part of the casing of said absorber rod, which end part is intended to be inserted first into a core of a nuclear reactor.

4. The absorber rod according to claim 1, wherein said casing is filled with pressurized helium.

5. The absorber rod according to claim 1, wherein said absorber material is an alloy having a low creep rate at a temperature at which said absorber material is used in said core of said nuclear reactor.

* * * * *

UNITED STATES PATENT AND TRADEMARK OFFICE
CERTIFICATE OF CORRECTION

PATENT NO. : 5,684,847
DATED : November 4, 1997
INVENTOR(S): Defoort

It is certified that error appears in the above-identified patent and that said Letters Patent is hereby corrected as shown below:

On the title page
[73] "Assignee: Framatome" should read --Assignees: Framatome and Cogema--.

Signed and Sealed this

Fifteenth Day of December, 1998

Attest:

BRUCE LEHMAN

Attesting Officer

Commissioner of Patents and Trademarks